United States Patent Office 2,834,691
Patented May 13, 1958

2,834,691

PROCESS FOR PREPARING A METAL SURFACE FOR COATING AND PRODUCT THEREOF

William Budd Stephenson, Jr., and Don Homer Greisl, Cincinnati, Ohio, assignors to General Electric Company, a corporation of New York No Drawing. Application October 9, 1956
Serial No. 614,787

4 Claims. (Cl. 117—65)

This invention relates to the surface treatment of iron or iron base alloys and, more particularly, relates both to a method for preparing on the surface of such materials an improved bonding layer for the reception of elevated temperature resistant films and to the bonding layer thus produced.

Frequently, high temperature paints, an example of which is aluminum pigmented silicone base paint, are used to coat objects such as furnaces, boilers, smoke stacks and parts of engines. However, a major problem is to produce adequate adhesion of the paint film to the metal surfaces operating above 700° F. Above that temperature not only do bonding agents such as phosphate coatings begin to deteriorate, but also a change begins to occur in the paint film itself. The standard coating system for use below 700° F. is not satisfactory in the critical temperature range which extends from about 700° F. to about 1200° F.

In dealing with coating systems which are not intended to be used at temperatures above 700° F., few problems arise in the selection of a bonding agent to be used between a base metal and a top film, for example a varnish or a paint. Frequently employed are phosphoric acid base solutions which often include additives to catalyze the reaction between the metal surface and the solution in order to form a metallic phosphate coating. Other coatings for bonding purposes are formed through the use of chromic acid base solutions or through the use of chromates. Similarly, oxalic acid is the base for some commercial paint bonding preparations.

Generally, these types of bonds and surface conversion coatings are satisfactory below about 700° F. Above that temperature, however, the phosphates and oxalates begin to dehydrate thereby causing failure and cracking of the covering film and subsequently non-adherence of that film to the base metal. Chromates generally deteriorate at temperatures above about 450° F. Chromic acid conversion coatings at about 700° F. no longer act as an adequate barrier to oxygen migrating either from within the metal or through the covering film. As long as the oxygen does not have a clear path through the film to the base metal, no appreciable amount of corrosion can occur. However, once a clear path is established, a galvanic type of cell operation can occur allowing corrosion to take place beneath the covering or paint film. The net result is that the paint film becomes non-adherent.

The principle object of our invention is to obviate the difficulties mentioned above by providing a method for treating iron or iron base metal surfaces with an aqueous solution of an alkali metal sulfate and a halogen acid so as to produce for subsequent coatings a hard and adherent bonding film stable up to about 1200° F.

Other objects and advantages of our invention will become apparent to those skilled in the art from the following description which is merely exemplary. The scope of our invention will be pointed out in the appended claims.

Briefly stated, in accordance with one aspect of our invention, we provide a method for producing a bonding film for the subsequent coating of iron or iron base metal articles, wherein the metal article is treated with an aqueous solution consisting of a hydrated alkali metal sulfate and a halogen acid and then the article is rinsed and heated to produce a hard and adherent film stable up to a temperature of about 1200° F.

We have found that the following range of composition for the aqueous solution gives the desired bonding film characteristics:

| | Percent by weight |
|---|---|
| Water | 80–88 |
| Halogen acid | 6–11 |
| Hydrated alkali sulfate | 6–9 |

We used the above described solution at a temperature of about 175–185° F. to treat the article prior to our rinsing and heating the article at about 400–440° F. for about 15–55 minutes to produce the hard, adherent bonding film. Our invention will be better understood from the following description incorporated in the succeeding examples which are given by way of illustration only, and not in any sense by way of limitation.

The thickness of bonding coating produced on an article by its contact with the above described solution is a function of the time of contact. In the case of a low alloy steel article, a contact time of 5–45 minutes produces good results. If the solution is used in the form of a bath for immersion of the article therein, the solution should be vigorously and continually agitated. We have found that mechanical agitation produces best results.

The particular iron or iron base metal alloy and its intended use will govern the thickness of bonding coating necessary to assure good adhesion for subsequent top coatings, for example, silicone paints or ceramic coatings. This means that the time the article must be subjected to the hydrated alkali sulfate-halogen acid solution and the time required for baking the coating thereby produced is a function of the article's material of construction.

While the principal use for our invention is as a hard and adherent bonding film for subsequent elevated temperature coatings, for example, silicone paints or ceramic coatings, we have found that the oil, grease and wax retention power of our bonding film is better than that of a metallic phosphate coating frequently employed as a base for oils, greases and waxes used to lubricate or to inhibit corrosion.

*Example 1.*—As exemplary of a low alloy steel treated with the above described solution, a material having the following composition was used in this example:

| | |
|---|---|
| Carbon | 0.18–0.23%. |
| Manganese | 0.40–0.60%. |
| Silicon | 0.60–0.90%. |
| Phosphorus | 0.040% max. |
| Sulfur | 0.040% max. |
| Chromium | 0.80–1.20%. |
| Molybdenum | 0.80–1.20%. |
| Vanadium | 0.08–0.15%. |
| Iron | Balance. |

We first cleaned the article in any well-known suitable cleaning system to remove oil, dirt and rust. Once cleaned, we treated the article with a solution consisting of the following composition for use with low alloy steel:

| | Percent by weight |
|---|---|
| Water | 82.2 |
| 37% by weight aqueous HCl solution | 8.9 |
| $Na_2SO_4 \cdot 7H_2O$ | 8.9 |

Although other compositions giving satisfactory results are described in other examples herein, the compositions and conditions shown in this example are our preferred conditions and ones which give optimum results in connection with the metal involved.

In this case, our method of treatment involved our immersion of the article in a tank containing a bath of the above specific composition held at a temperature of about 180° F. and agitated vigorously by a mechanical method. After 40 minutes in this bath, a suitable, soft bonding film was produced on the surface of the immersed article. We then removed the article from the bath and rinsed it free of the treating solution. After drying, we heated the article, in this case in an oven, at a temperature of 425° F. for 40 minutes. The film on the surface of the article, which was soft and non-adherent before heating, became hard and extremely adherent.

In order to test the adhesion and bonding qualities of this film, we then coated the treated article with an aluminum pigmented silicone base paint and cured the paint at 425° F. for two hours.

A number of articles thus coated were aged for 200 hours at temperatures up to 1200° F. Adhesion of the paint to the base metal after aging was good. Salt spray tests to determine porosity after aging as indicated above showed no corrosion of the article after 72 hours under A. S. T. M. salt spray conditions. The following table compares the adhesion results of the article coated as described above with articles processed in other manners and similarly painted and cured.

| Bonding Chemical | Adhesion of Paint After Paint Cure | Adhesion of Paint After Aging 16 Hrs. at 800° F. | Adhesion of Paint After Aging 200 Hrs. at 1,200° F. |
| --- | --- | --- | --- |
| Zinc phosphate | good | fair | poor. |
| Ammonium polysulfide | poor | | |
| Sodium sulfide | do | | |
| Sodium oxalate | fair | poor | |
| Hydrated sodium sulfate | good | good | good. |
| Anhydrous sodium sulfate | fair | poor | |
| Sodium chromate | good | fair | poor. |

Tests of articles in both stressed and unstressed conditions showed no presence of stress corrosion or hydrogen embrittlement after processing in the solution described in this and subsequent examples herein.

*Example II.*—Following the procedure as described in Example I herein, unsatisfactory bonding conditions were obtained from bonding films produced from the following solution using anhydrous sodium sulfate rather than hydrated sodium sulfate:

|  | Percent |
| --- | --- |
| Water | 82.2 |
| 37% by weight aqueous HCl solution | 8.9 |
| $Na_2SO_4$ (anhydrous) | 8.9 |

Following the same procedure as in Example I, satisfactory bonding conditions were obtained from bonding films produced from the following solution:

*Example III*

|  | Percent |
| --- | --- |
| Water | 82.2 |
| 37% by weight aqueous HCl solution | 8.9 |
| $Na_2SO_4 \cdot 10H_2O$ | 8.9 |

*Example IV*

| Water | 80 |
| --- | --- |
| 37% by weight aqueous HCl solution | 11 |
| $Na_2SO_4 \cdot 7H_2O$ | 9 |

*Example V*

| Water | 80 |
| --- | --- |
| 37% by weight aqueous HCl solution | 11 |
| $Na_2SO_4 \cdot 10H_2O$ | 9 |

*Example VI*

| Water | 88 |
| --- | --- |
| 37% by weight aqueous HCl solution | 6 |
| $Na_2SO_4 \cdot 7H_2O$ | 6 |

*Example VII*

| Water | 88 |
| --- | --- |
| 37% by weight aqueous HCl solution | 6 |
| $Na_2SO_4 \cdot 10H_2O$ | 6 |

*Example VIII*

As indicative that other iron base alloys can be treated as described herein, we followed the same procedure as shown in Example I and obtained satisfactory results using a material having the following composition:

| Carbon | 0.40–0.50%. |
| --- | --- |
| Manganese | 0.40–0.70%. |
| Silicon | 0.20–0.35%. |
| Phosphorus | 0.025% max. |
| Sulfur | 0.025% max. |
| Chromium | 0.80–1.10%. |
| Molybdenum | 0.45–0.65%. |
| Vanadium | 0.25–0.35%. |
| Iron | Balance. |

From the foregoing description, we have shown that a hard, adherent bonding layer for the reception of elevated temperature resistant films can be produced through the use of an aqueous solution consisting of a halogen acid and a hydrated alkali sulfate.

Although this invention has been described by reference to particular embodiments thereof, it will be understood by those skilled in the art that numerous modifications and substitutions may be affected without departing, either in spirit or scope, from this invention in its broadest aspects.

What we claim as new and desire to secure by Letters Patent of the United States is:

1. A method of preparing iron or an iron base metal article to produce a bonding film for subsequent coating comprising the steps of: treating the article with an aqueous solution including about 6–9% by weight hydrated sodium sulfate and about 6–11% by weight hydrochloric acid solution having a concentration of about 37% by weight of hydrogen chloride until a soft bonding film is produced on the surface of the article; rinsing the article; and then heating the article to about 400–440° F. to convert the soft bonding film to a hard and adherent form.

2. The method of claim 1 wherein the temperature of the aqueous solution is about 175–185° F.

3. A method of preparing iron or an iron base metal article to produce a bonding film for subsequent coating comprising the steps of: treating the article with an aqueous solution including about 8.9% by weight hydrated sodium sulfate and about 8.9% by weight hydrochloric acid solution, having a concentration of about 37% by weight hydrogen chloride, until a soft bonding film is produced on the surface of the article; rinsing the article; and then heating the article to about 400–440° F. to convert the soft bonding film to a hard and adherent form.

4. A composition of matter for use in preparing iron or an iron base metal article to produce a bonding film for subsequent coating comprising in percent by weight: 6–9 hydrated sodium sulfate; 6–11 hydrochloric acid (37% HCl); the remainder essentially water and impurities.

References Cited in the file of this patent

UNITED STATES PATENTS

| 2,409,271 | Goldowski | Oct. 15, 1956 |
| 2,759,862 | Henticks | Aug. 21, 1956 |

FOREIGN PATENTS

| 741,128 | Great Britain | Nov. 30, 1955 |